US011240173B2

(12) United States Patent
Larabi et al.

(10) Patent No.: US 11,240,173 B2
(45) Date of Patent: Feb. 1, 2022

(54) METHOD AND REQUEST ROUTER FOR DYNAMICALLY POOLING RESOURCES IN A CONTENT DELIVERY NETWORK (CDN), FOR EFFICIENT DELIVERY OF LIVE AND ON-DEMAND CONTENT

(71) Applicants: Adel Larabi, Piererfonds (CA); Zhongwen Zhu, Saint-Laurent (CA); Jansen Robillard, Beaconsfield (CA); Julien Grillon-Labelle, Montreal (CA)

(72) Inventors: Adel Larabi, Piererfonds (CA); Zhongwen Zhu, Saint-Laurent (CA); Jansen Robillard, Beaconsfield (CA); Julien Grillon-Labelle, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 321 days.

(21) Appl. No.: 16/468,574

(22) PCT Filed: Dec. 4, 2017

(86) PCT No.: PCT/IB2017/057621
§ 371 (c)(1),
(2) Date: Jun. 11, 2019

(87) PCT Pub. No.: WO2018/109612
PCT Pub. Date: Jun. 21, 2018

(65) Prior Publication Data
US 2021/0281522 A1 Sep. 9, 2021

Related U.S. Application Data
(60) Provisional application No. 62/435,433, filed on Dec. 16, 2016.

(51) Int. Cl.
H04L 12/911 (2013.01)
H04L 12/923 (2013.01)
H04L 12/927 (2013.01)

(52) U.S. Cl.
CPC .......... H04L 47/781 (2013.01); H04L 47/762 (2013.01); H04L 47/801 (2013.01); H04L 47/803 (2013.01)

(58) Field of Classification Search
CPC ... H04L 47/781; H04L 47/762; H04L 47/801; H04L 47/803; H04L 47/72
See application file for complete search history.

(56) References Cited

U.S. PATENT DOCUMENTS 6,108,703 A * 8/2000 Leighton ................. H04L 29/06
709/226
10,178,043 B1 * 1/2019 Ganjam ................. H04L 47/801
(Continued)

FOREIGN PATENT DOCUMENTS

CN 101026631 A 8/2007
CN 101998145 A 3/2011
(Continued)

Primary Examiner — Shah M Rahman
(74) Attorney, Agent, or Firm — Ericsson Canada Inc.; Julie Dufort

(57) ABSTRACT

A method and request router (RR) are provided for dynamically pooling resources in a Content Delivery Network (CDN), for efficient delivery of live and on-demand content. The method comprises receiving, at the RR, a request for a content from a client, determining a content type associated with the request for the content, the content type being one of: live content and on-demand content. The method also comprises, based on the determined content type, dynamically electing, at the RR, delivery nodes at edge, region or core for content delivery and grouping the dynamically elected nodes into a resource pool, selecting a delivery node within the resource pool for delivering the content and
(Continued)

sending a response to the client including an address of the delivery node selected within the resource pool to be used to get the requested content.

14 Claims, 13 Drawing Sheets

(56) References Cited

U.S. PATENT DOCUMENTS

| | | | |
|---|---|---|---|
| 2003/0002484 A1 | 1/2003 | Freedman | |
| 2003/0046396 A1* | 3/2003 | Richter | G06F 9/505 |
| | | | 709/226 |
| 2003/0099237 A1* | 5/2003 | Mitra | H04L 45/64 |
| | | | 370/393 |
| 2004/0010562 A1 | 1/2004 | Itonaga | |
| 2006/0143293 A1 | 6/2006 | Freedman | |
| 2007/0061440 A1 | 3/2007 | Sundaram et al. | |
| 2008/0201428 A1* | 8/2008 | Dubnicki | G06F 16/10 |
| | | | 709/205 |
| 2011/0107364 A1 | 5/2011 | Lajoie et al. | |
| 2011/0225417 A1* | 9/2011 | Maharajh | H04L 65/4076 |
| | | | 713/150 |
| 2012/0198075 A1 | 8/2012 | Crowe et al. | |
| 2013/0159388 A1* | 6/2013 | Forsman | H04N 21/6581 |
| | | | 709/203 |
| 2013/0227625 A1* | 8/2013 | Forsman | H04L 47/825 |
| | | | 725/109 |
| 2014/0195653 A1* | 7/2014 | Alexander | H04L 65/4084 |
| | | | 709/219 |
| 2015/0019964 A1* | 1/2015 | Campbell | H04L 65/4084 |
| | | | 715/716 |
| 2015/0188842 A1* | 7/2015 | Amidei | H04L 47/783 |
| | | | 709/226 |
| 2015/0271100 A1* | 9/2015 | Huang | H04L 47/782 |
| | | | 709/226 |
| 2016/0269791 A1* | 9/2016 | Laczynski | H04N 21/2543 |
| 2017/0237667 A1* | 8/2017 | Wang | H04L 47/803 |
| | | | 709/226 |
| 2018/0131633 A1* | 5/2018 | Li | H04L 47/72 |
| 2018/0159796 A1* | 6/2018 | Wang | H04N 21/64738 |
| 2018/0288141 A1* | 10/2018 | Mo | H04L 67/2842 |

FOREIGN PATENT DOCUMENTS

| | | |
|---|---|---|
| CN | 102404378 A | 4/2012 |
| CN | 104320487 A | 1/2015 |

* cited by examiner

METHOD AND REQUEST ROUTER FOR DYNAMICALLY POOLING RESOURCES IN A CONTENT DELIVERY NETWORK (CDN), FOR EFFICIENT DELIVERY OF LIVE AND ON-DEMAND CONTENT

TECHNICAL FIELD

The present disclosure relates to content delivery networks, request routing, and live and on-demand content delivery.

BACKGROUND

CDN delivers content to users on the behalf of content providers. In general, the content can be classified into two categories: live content and non-live (or on-demand) content.

In the context of this disclosure, live means "live broadcasting", in which case the same content is delivered to a massive number of clients at the same time. The demanded throughput for live content is normally very high, and latency is very critical and shall be at the milliseconds level. Non-live content means "on-demand" content. One example of on-demand content is video-on-demand (VoD).

For on-demand content, such as VoD, there are two basic scenarios. First, there is the popular content which attracts a massive number of clients. Although those clients may request to get the popular content at different time slots, they might request to watch it at the same time. In the last case, it ends up being a situation similar to "live broadcasting". The difference is that the size of VoD content is known from the beginning, which is not the case for live content. For this type of on-demand content, the demand on throughput is very high, and the latency shall be at the millisecond level as latency is also very critical to those users. Under this category, the following two cases are also considered: A. Scheduled major events, such as new movie/series releases. In this case, a massive number of clients are expected to consume the content at a scheduled time. Hence, the content (new movie, new game release) can be pre-positioned in the content delivery network (CDN) for the expected high-volume of traffic. B. Content gaining popularity as time goes. In this case, the traffic for this content increases gradually. Basically, the content has been ingested by the CDN well before it becomes popular.

Second, there is the non-popular content, also called "long-tail asset", which is only consumed by a handful of clients. The content has to be kept in the CDN as well, even if the demand throughput is low and the latency at the beginning is not so critical. For this type of content, a latency around the "seconds" level instead of "milliseconds" level is acceptable.

In the context of this disclosure, the scheduled major events, such as movie release, although being on-demand content, may be treated in the same manner as the live content, if and/or when appropriate, e.g. close to the release time or during peak consumption.

FIG. 1 illustrates a typical CDN 100 deployment with multi-tier structure.

Delivery nodes 140, 150, 160 are deployed in edge, region and core tiers. The delivery nodes at edge 140 face end users while the delivery nodes at core layer 150, 160 connect to the content provider's 170 origin server 120. Core layer may occasionally mean and comprise region as well as core layer in the context of this specification.

The Request Router (RR) 110 is responsible for steering CDN traffic, which comprises:
  traffic between the end users and delivery nodes at edge;
  traffic among delivery nodes at edge, region and core tiers; and
  traffic between delivery nodes at core tier and content provider's origin.

In order to reduce the footprint in the cache of delivery nodes as well as to have efficient routing between the delivery nodes, a content-based hashing algorithm (e.g. rendez-vous hashing, consistent hashing, or other algorithm etc.) is used in the RR to make a routing decision. It is called a CBRR (Content based Request Routing).

FIG. 2 illustrates live content delivery, where the clients 130 from mesh X 135a (which may correspond to a specific IP range associated with an area or location) access the edge delivery node 140a, on the left side, due to the proximity, while the clients 130 from mesh Y 135b access the edge delivery node 140b, on the right side, also due to proximity. Then, clients requests are proxied by the edge delivery nodes to the region delivery nodes 150, core delivery nodes 160, and eventually to the origin server 120, which is serving the live content.

For live events, since a massive number of clients are watching the same content at the same time, all the requests from the end users 130 are filtered out due to the caching ability of the delivery nodes at each tier. In other words, several concurrent incoming requests are queued and only one, e.g. the first one, is sent to the next (or upper) tier delivery node.

Eventually, the number of requests per second towards the origin 120 is significantly reduced. This leads to a better control of the bandwidth usage between core delivery nodes and the origin server 120.

The media segments of live content normally have a short live period. These segments are preferably kept in memory, Solid State Drive (SSD) instead of Hard Disk Drive (HDD), to provide a fast response to the requests, since the latency is very critical to live content delivery. In order to be able to provide such fast response, the media segments (e.g. all of the media segments or a significant portion of the media segments) are stored in memory or SSD at each tier. They are used to serve the next client requests.

As one can see, this multi-tier deployment of delivery nodes 140, 150, 160 reduces the bandwidth usage towards origin server significantly and it benefits the live content delivery.

However, such a multi-tier deployment is not suitable for non-live content such as VoD content delivery.

SUMMARY

There is provided a method, executed in a request router (RR), for dynamically pooling resources in a Content Delivery Network (CDN), for efficient delivery of live and on-demand content. The method comprises receiving a request for a content from a client, determining a content type associated with the request for the content, the content type being one of: live content and on-demand content, and based on the determined content type, dynamically electing delivery nodes at edge, region or core for content delivery and grouping the dynamically elected nodes into a resource pool. The method comprises selecting a delivery node within the resource pool for delivering the content and sending a response to the client including an address of the delivery node selected within the resource pool to be used to get the requested content.

There is provided a request router (RR) comprising processing circuitry and a memory, the memory containing instructions executable by the processing circuitry whereby the RR is operative to receive a request for a content from a client, determine a content type associated with the request for the content, the content type being one of: live content and on-demand content, and based on the determined content type, dynamically elect delivery nodes at edge, region or core for content delivery and group the dynamically elected nodes into a resource pool. The RR is operative to select a delivery node within the resource pool for delivering the content, and send a response to the client including an address of the delivery node selected within the resource pool to be used to get the requested content.

The method, delivery nodes and request router provided herein present improvements to the way content delivery networks operate.

Certain embodiments may provide one or more of the following technical advantage(s).

Some embodiments described herein can increase the usage of CDN capacity for both live and on-demand content delivery. This leads to a reduction of the overall throughput and storage per delivery node.

Traffic towards content origin is reduced and better controlled.

A subscriber can benefit from the proposed solution to have good user experience in his device.

DETAILED DESCRIPTION

Various features and embodiments will now be described with reference to the figures to fully convey the scope of the disclosure to those skilled in the art.

In some alternate embodiments, the functions/actions may occur out of the order noted in the sequence of actions or simultaneously. Furthermore, in some illustrations, some blocks, functions or actions may be optional and may or may not be executed; these are generally illustrated with dashed lines.

Figure 1:
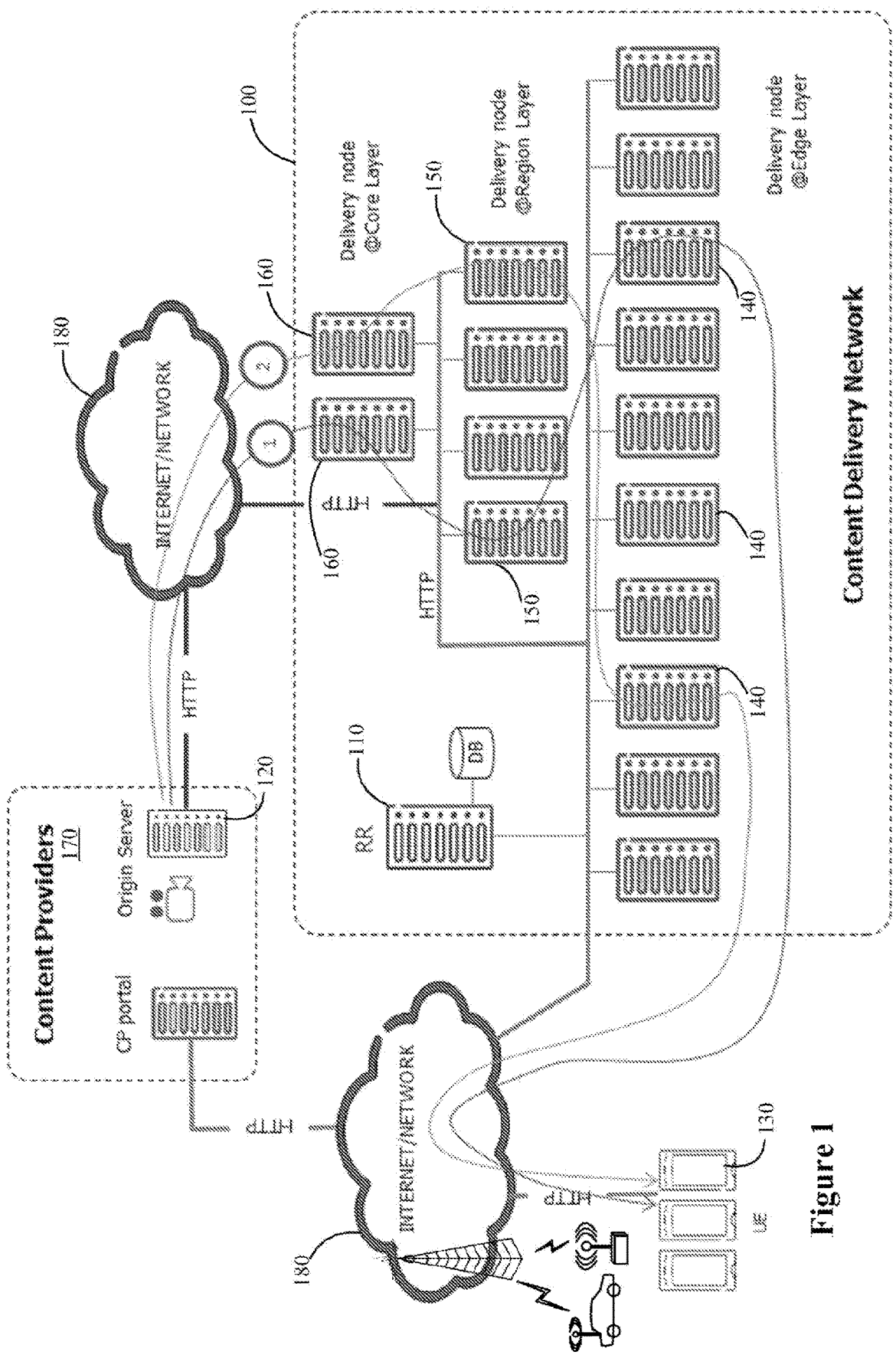
FIG. 1 is a schematic illustration of a content delivery network.
Figure 2:
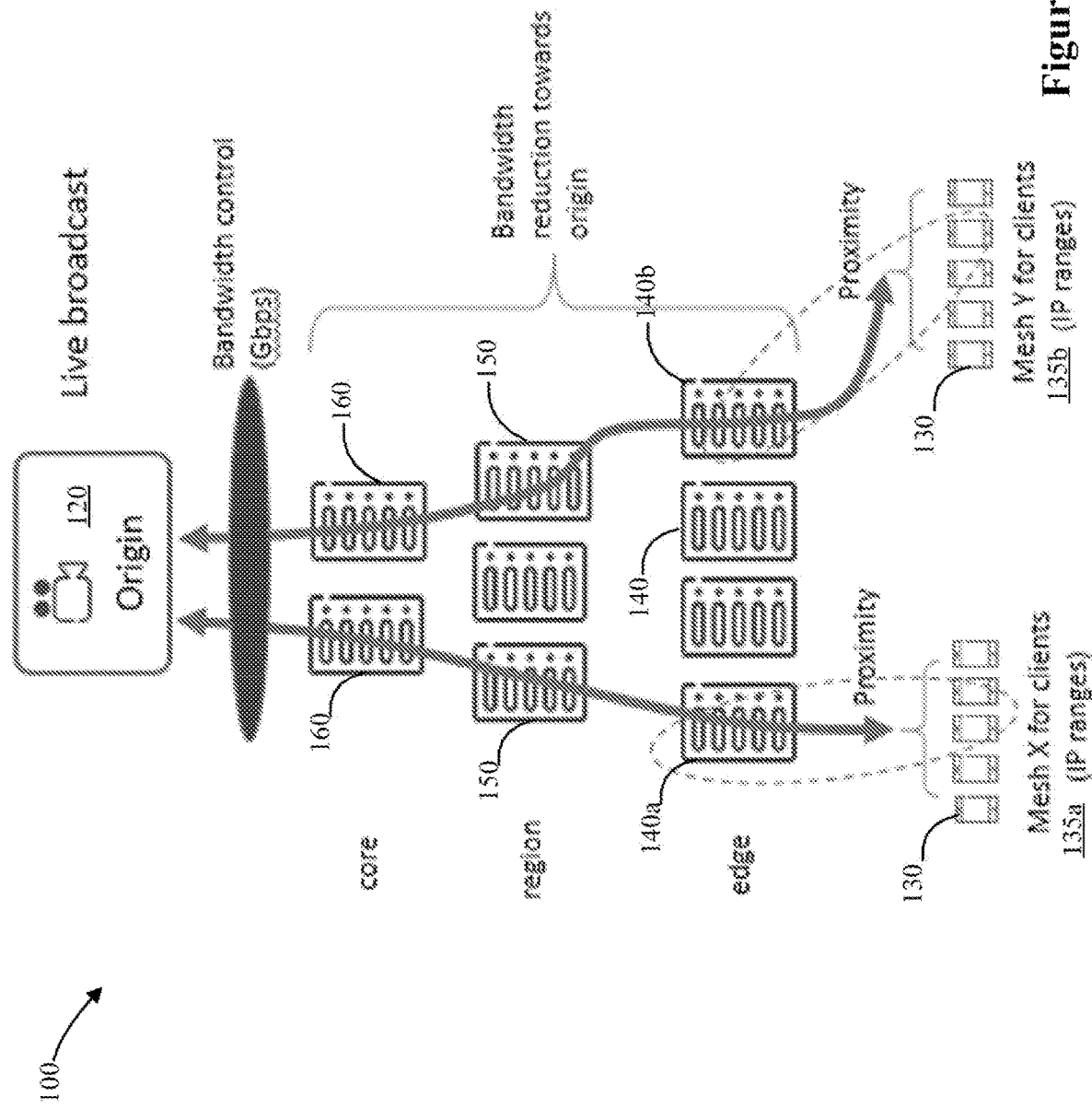
FIG. 2 is a schematic illustration of an example traffic routing from end user to origin server for live content delivery.

As explained previously, the multi-tier deployment described in relation with FIGS. 1 and 2 is not suitable for non-live content such as VoD content delivery. This is because a video library normally contains a lot of content (thousands of segments for Adaptive Bit Rate (ABR) content), most of which lose their popularity as time goes. In addition, memory or SSD cannot hold a whole content library due to its storage capacity. Hence most of the content resides on HDD.

When a content stored on HDD is served in response to a client request, it takes time and computational effort (e.g. I/O operation). Hence it increases CPU usage and adds latency to the response.

Therefore, if VoD contents are stored on delivery nodes which are delivering live content, these delivery nodes will suffer from the performance degradation on live content delivery as well as poor VoD content delivery.

For each delivery node, the total throughput can be measured by the number of requests per second, the number of assets and the corresponding asset size and can be computed using the following formula.

$$\text{Throughput(Bandwidth)} = N*FZ*TPS$$

In the formula above, N is the number of assets, FZ is the average file size for an asset and TPS is the number of transactions (concurrent requests) per second.

The table below shows that characteristic of live content and non-popular on-demand content is very different.

| Type of content | | N Number of assets | FZ Average file size for an asset | TPS Number of transactions per second | Latency requirements for end users |
|---|---|---|---|---|---|
| Live content | | Small (a handful of channels or assets) | Small (multiple media file segments, each one lasts a couple of seconds) | Large | Critical (milliseconds) |
| VoD content | popular | Small (due to the popularity) | Vary from small to large They can be managed through Byte-range request/response | Large | Critical (milliseconds) |
| | Non-popular | Large | Vary from small to large | Small | Acceptable at second level |

Managing both live content and on-demand content delivery within a single CDN 100 without performance penalty is a challenging task. This is one issue that this disclosure is trying to solve. The proposed solution leads to an increase in CDN capacity and a decrease of the overall latency, throughput, etc.

A proposed solution to solve the above the stated problems is to combine live content delivery and on demand content delivery, e.g. VoD, into a single CDN 100 through the use of a request router (RR) 110 which makes routing decision based on content, content type as well as available resources.

Live content delivery has been described previously in relation with FIG. 2. As already explained, for live content, the multi-tier deployment with caching the media segments in fast memory storage, such as memory or SSD is used. The same type of deployment can also be used for very popular on-demand content, such as a new movie release, at peak consumption time.

Figure 3:
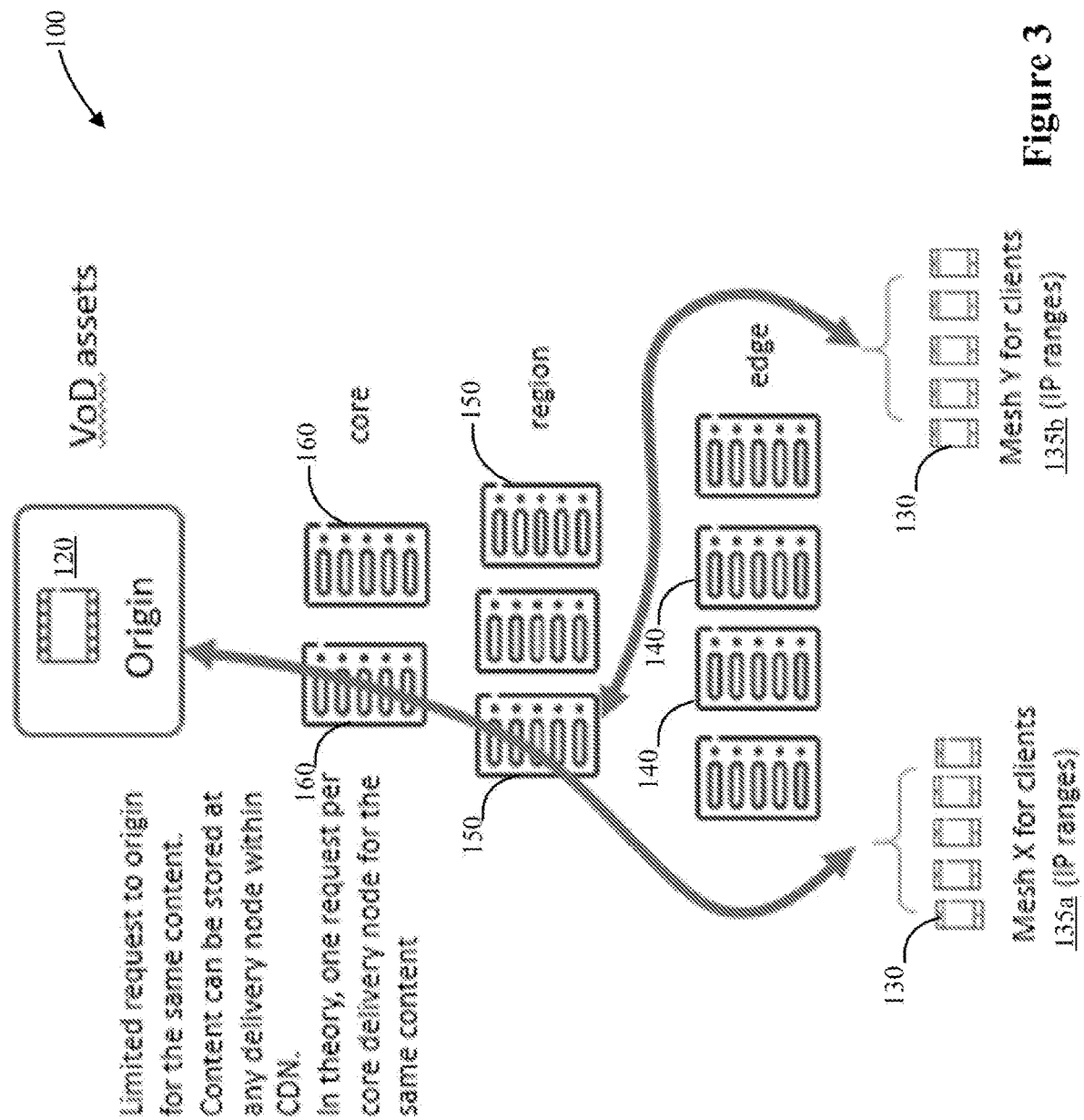
FIG. 3 is a schematic illustration of traffic routing from end users to CDN for on-demand content delivery according to an embodiment.

FIG. 3 illustrates a proposed content delivery mechanism for non-popular on-demand content delivery. The main objectives of the solution of FIG. 3 are:
- to keep the non-popular on-demand content, such as VoD, in relatively slow memory storage, such as HDD unless/until it becomes popular;
- to distribute different on-demand content into different delivery nodes 140, 150, 160 at different tiers within CDN 100 in order to reduce the number of different assets per delivery node;
- to select any delivery node to serve the clients 130 who request non-popular on-demand content since the latency is not critical and since the client can buffer the contents in its device; and
- when the on-demand content becomes popular, the delivery node that has cached the content promotes the content from slow memory storage to fast memory storage, e.g. promotion from HDD to memory or SSD and thereafter serves the content from its memory or SSD.

To realize these objectives for on-demand content, the solution according to an embodiment applies CBRR (Content Based Request Routing) hashing to all nodes within CDN dynamically elected. All the elected delivery nodes, e.g. edge 140, region 150 or core delivery nodes 160, are grouped into a single tier. Among these delivery nodes, CBRR is applied and one of them is selected. This dynamic election and grouping process may also be referred to as dynamic pooling or clustering. The client 130 request is then redirected to the selected node for that specific content. The selected delivery node fetches the content either from a next-tier delivery node or from the origin 120, and caches the received content in slow storage such as HDD (due to the low popularity). In this way different on-demand contents are distributed across different delivery nodes within the CDN 100. As a consequence, each delivery node has a smaller number of different assets (in the context of this disclosure, asset may be used interchangeably with content). Further, the duplication of the same content within the CDN 100 is reduced or avoided completely and storage capacity for long-tail content is increased.

The proposed solution relies on the CDN Request Router (RR) 110 to redirect the client request for non-popular on-demand content to the delivery nodes within the CDN 100. The selected delivery node can be at edge, region or core tier. But for the live content, the CDN RR 110 always redirects the client request to an edge node 140 based on the proximity as first priority on top of all other metrics like traffic load, health-check, policies etc.

Figure 4:
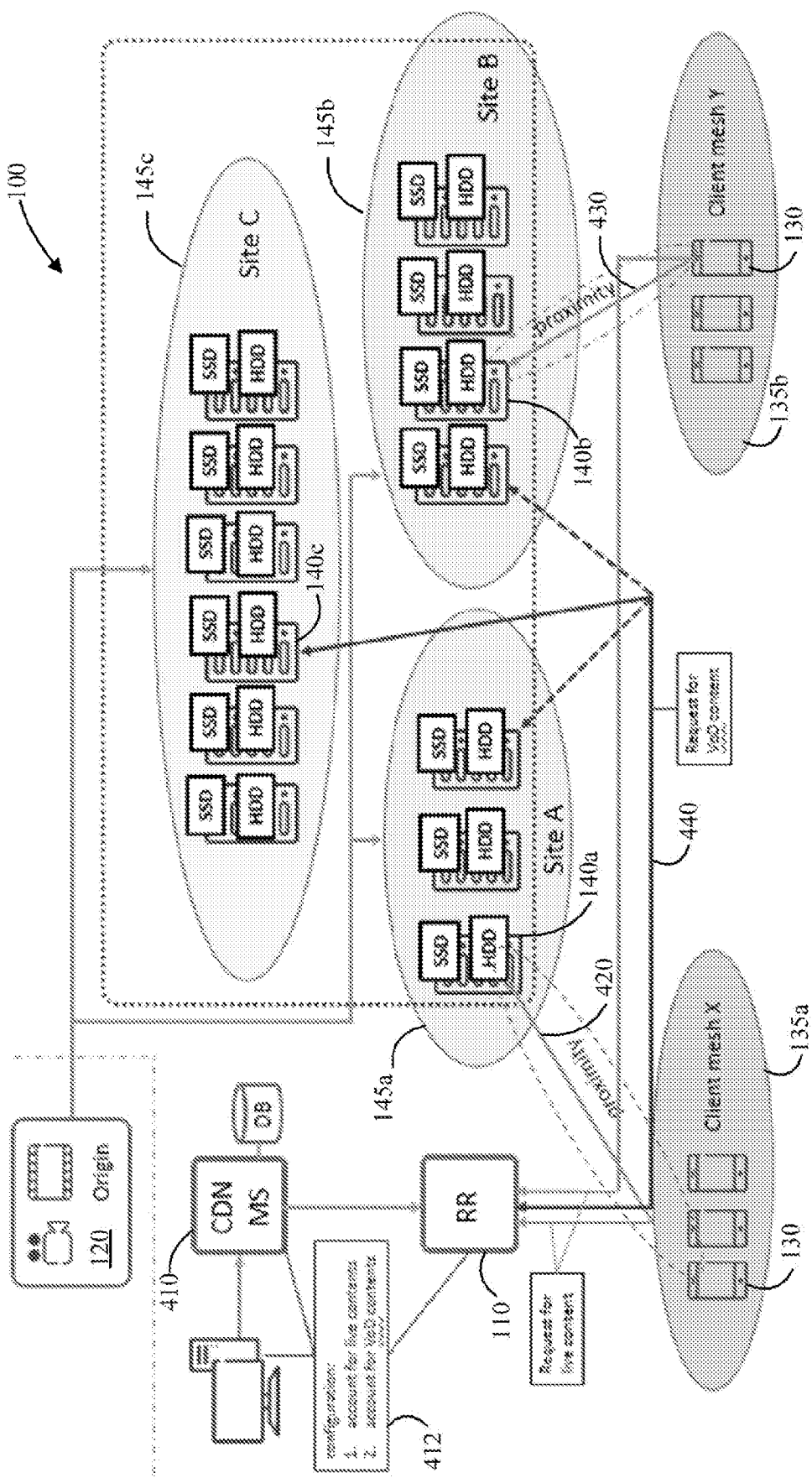
FIG. 4 is a schematic illustration of intelligent routing based on content, content type as well as available resources according to an embodiment.

FIG. 4 shows that two different accounts 412 are configured via a CDN Management System (MS) 410. One is for live content delivery, the other is for on-demand, e.g. VOD, content delivery. When a client 130 request is received, the CDN RR 110 checks the content type under the accounts. If the content-type is "live", the CDN RR 110 redirects client requests for clients in mesh X 135a to an edge delivery node 140a at site A 145a and redirects client requests for clients in mesh Y 135b (which may correspond to a specific IP range associated with an area or location) to an edge delivery node 140b at site B 145b, according to the proximity, as illustrated by the lines labeled proximity 420, 430 in FIG. 4.

If a client from mesh X 135a sends a request for a non-popular VoD content, the CDN RR 110 redirects the request, for example, to a delivery node 140c at site C 145c, as shown in FIG. 4, referring to the lines 440 identified with a box labeled "Request for VoD content". In the case of VoD, proximity is not taken into account.

Since the popularity of VoD content is usually very low, the content can remain in the slow storage, e.g. the HDD, and has no impact on the ongoing live content delivery from memory or SSD at the given node.

Figures 5A, 5B:
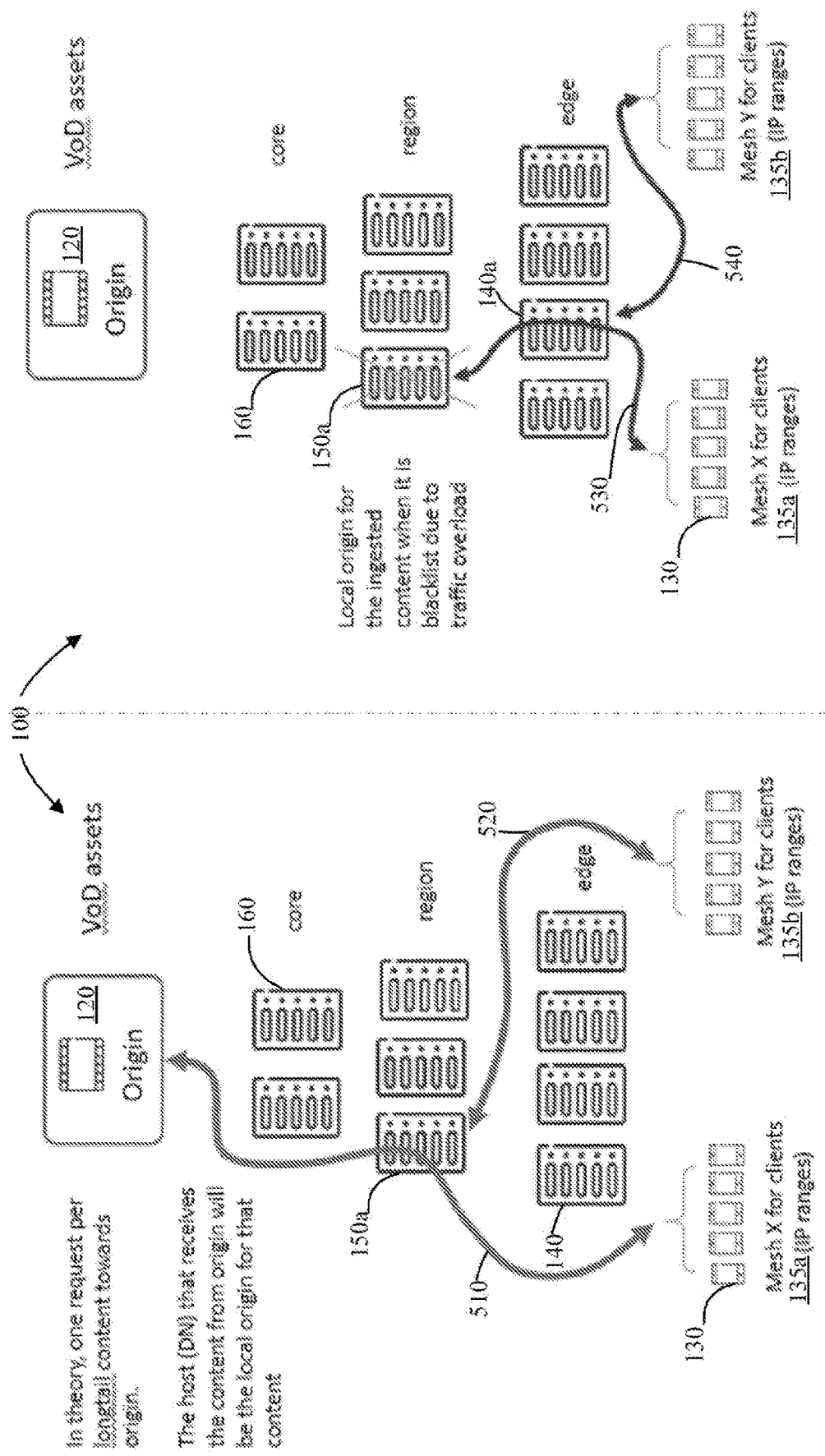
FIG. 5 a and b are schematic illustrations of dynamic local origin for long tail on-demand content delivery according to some embodiments.

FIGS. 5a and b illustrate alternative scenarios for non-popular on-demand content delivery.

As shown in FIG. 5a, the delivery node 150a in the region tier is located for a requested non-popular content delivery. The delivery node 150a is located based on the CBRR at a first time. Since the content is not cached yet, that delivery node at region 150a sends the request to the content provider's origin 120 to get the content. After receiving the content, the delivery node 150a stores and serves the content to the clients 130.

Since the same delivery node 150a is used for other accounts as well, and is also used for live content delivery, it can be blacklist due to traffic overload, e.g. for traffic which exceeds a threshold at the node level. In this case, this delivery node 150a is not available, as shown in FIG. 5b, for end users to get any content (including long tail on-demand content). However, in such circumstances, it is converted to a local origin for those long tail contents cached in its storage (HDD).

When the delivery node at region 150a is blacklist due to the traffic overload, it is turned to be a local origin for those long tail contents in its storage. Based on CBRR, a delivery node at edge 140a is picked up for delivering the requested non-popular on-demand content. Since the content is not in its cache, the delivery node at edge 140a sends the request to the local origin 150a (delivery node at region) to get the content and serves it to the end users 130.

At this point, the edge delivery node 140a can store it in its cache or not depending on the popularity of the requested content. This option (caching based on the popularity) can be configured at the node level. If the decision is made not to cache the content, the delivery node 140a only proxies the client request to the local origin 150a, and proxies the response back to the client 130 without storing it. It means that there is only one copy for non-popular content within CDN 100, still in the region node 150a. If the decision is made to cache the content, the delivery node at the edge 140a, stores the content in its cache. This means that two copies of the same content are kept within CDN 100 and a subsequent request 540 can be served by the edge node 140a that caches the content.

The delivery node at region 150a that did first get the content from the origin server is considered as a local origin within the CDN 100. Those long tail/non-popular contents in HDD, for which there may be only one copy within the CDN, should be handled as high priority to be kept when the eviction on disk is triggered due to over-usage of the disk space (HDD). However, if indeed those contents are removed during the eviction, the delivery node can still go to the origin 120 to get the content, which is a tradeoff.

Figure 6:
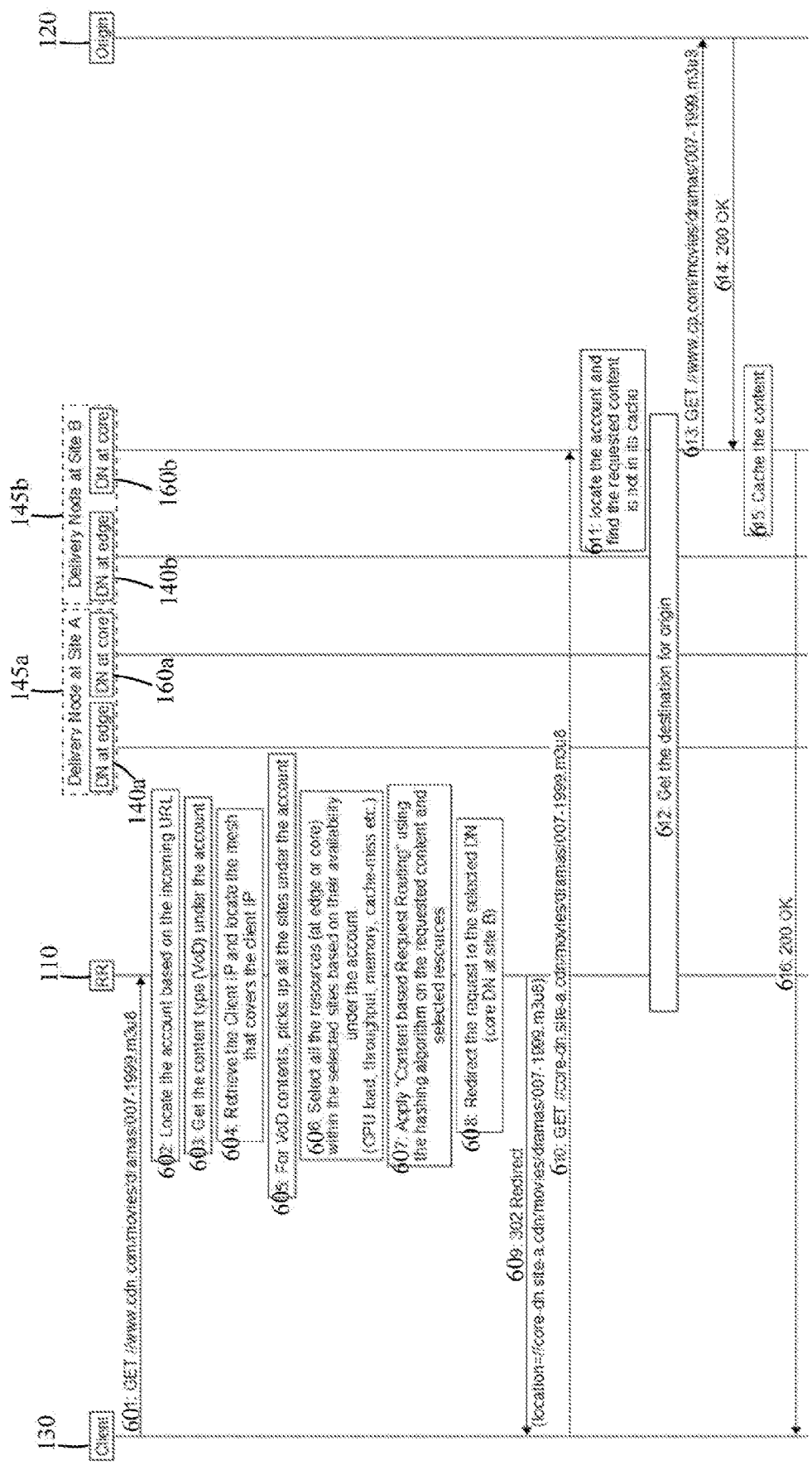
FIG. 6 is a traffic flow for on-demand content delivery according to an embodiment.

FIG. 6 illustrates a traffic flow for VoD content delivery according to an embodiment. At step 601, a client 130 sends a request towards the RR 110 to get a content. At step 602, the RR 110 locate the account based on the incoming URL. At step 603, the RR 110 gets the content type (e.g. VoD) under the account, this may be a property of the content, or it can be a property of the account, for example. Other ways of indicating the content type may also be possible. At step 604, the RR 110 retrieves the client Internet Protocol (IP) address and locates the mesh 135 that covers the client IP address. At step 605, the RR 110, for the VoD content, picks up some or all the sites 145 under the account. At step 606, the RR 110 selects all the resources 140, 150, 160 (at edge, region or core) within the selected sites 145 based on their availability under the account (CPU load, throughput, memory, cache-miss, etc.). At step 607, the RR 110 applies content based request routing using a hashing algorithm on the requested content and selected resources. This algorithm has the particularity that it distributes the content all across the CDN 100 in such a way that on-demand non-popular content is replicated as few times as possible in the CDN 100 and that each the delivery node 140, 150, 160 contains as few on-demand content as possible. At step 608, the RR 110 redirects the request to the delivery node selected using the content based request routing algorithm. In the example embodiment of FIG. 6, it is e.g. a core DN 160b at site B 145b. At step 609, the RR 110 sends a response to the client 130 with a "302 redirects" with the address of the selected core delivery node 160b, at site B 145b. At step 610, the client 130 sends a request to get the content from the core DN 160b at site B 145b. At step 611, the core DN 160b at site B145b locates the account for the content and determines that the requested content is not in its cache. At step 612, the core DN 160b at site B 145b gets the destination for the origin from the RR 110. In order to do so, the core DN 160b at site B 145b may send a request for the content destination origin to the RR 110 and the RR may, upon receiving the request for the content destination origin, return the destination origin for the content. At step 613, the core DN 160b at site B 145b sends a request for the content to the origin 120. At step 614, the core DN 160b at site B 145b receives in return to its request a 200 OK and the content. At step 615, the core DN 160b at site B 145b stores the content in its cache. At step 616, the core DN 160b at site B 145b returns a 200 OK and the content to the client 130.

Figure 7:
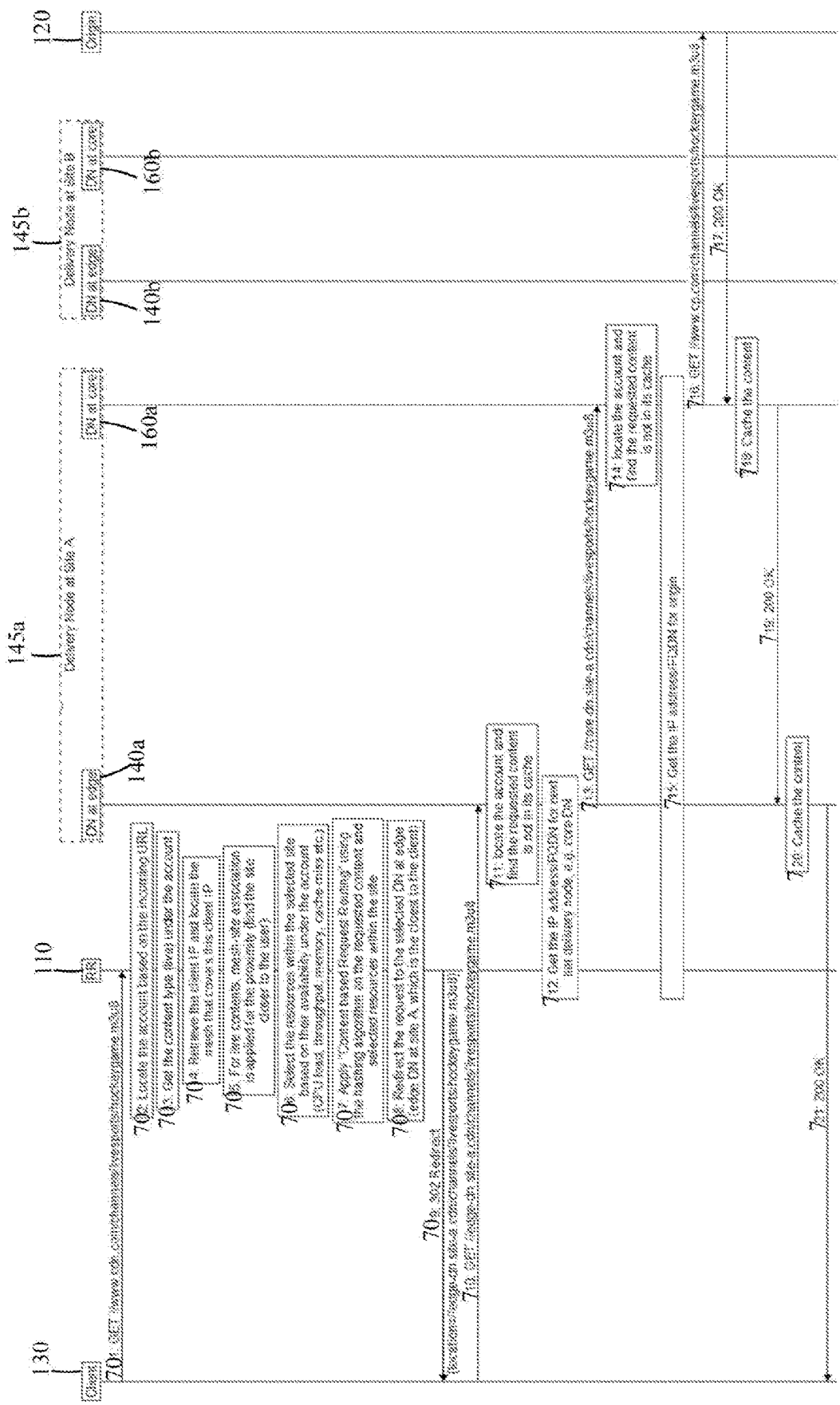
FIG. 7 is a traffic flow for live content delivery according to an embodiment.

FIG. 7 illustrates a traffic flow for live content delivery according to an embodiment. At step 701, a client 130 sends a request towards a RR 110 to get a content. At step 702, the RR 110 locate the account based on the incoming URL. At step 703, the RR 110 gets the content type (e.g. live content) under the account, which may be a property of the content, or which may be a property of the account, for example. Other ways of indicating the content type may also be possible. At step 704, the RR 110 retrieves the client IP address and locates the mesh 135 that covers the client IP address. At step 705, the RR 110, for the live content, applies a mesh-site association based on proximity, i.e. the RR 110 finds the site 145 closest to the client. At step 706, the RR 110 selects the resources within the selected site based on their availability under the account (CPU load, throughput, memory, cache-miss, etc.). At step 707, the RR 110 applies content based request routing using a hashing algorithm on the requested content and selected resources within the site. The algorithm preferably selects an edge DN 140a close in location to the client for providing live content. At step 708, the RR 110 redirects the request to the selected delivery node at edge 140a using the content based request routing algorithm. The selected DN 140a is at edge in site A 145a, and is the closest to the client 130. In the example embodiment of FIG. 6, it was e.g. a core DN at site B. At step 709, the RR 110 sends a response to the client 130 with a "302 redirects" with the address of the selected edge DN 140a, at site A 145a. At step 710, the client 130 sends a request to get the content from the edge DN 140a at site A145a. At step 711, the edge DN 140a at site A 145a locates the account for the content and determines that the requested content is not in its cache. At step 712, the edge DN 140a at site A 145a sends a request to the RR 110 to get an IP address or fully qualified domain name (FQDN) for the next tier delivery node (e.g. a region DN 150 or core DN 160) from the RR 110 and gets the IP address or FQDN from the RR 110. At step 713, the edge DN 140a at site A 145a sends a request for the content to a core DN 160a at site A145a. At step 714, the core DN 160a at site A 145a locates the account and finds that the requested content is not in its cache. At step 715, the core DN 160a at site A 145a sends a request to the RR 110 to get the IP address or FQDN for the origin 120 and, in response to the request, received that IP address or FQDN for the origin 120. At step 716, the core DN 160a at site A 145a sends a request to the origin 120 to get the live content. At step 717, the core DN 160a at site A 145a receives a 200 OK and the content. At step 718, the core DN 160a at site A 145a stores the content in its cache. At step 719, the core DN 160a at site A 145a returns a 200 OK and the content to the edge DN 140a at site A145a. At step 720, the edge DN 140a at site A 145a caches the content. At step 721, the edge DN 140a at site A 145a sends a 200 OK and the content to the client 130.

Figure 8:
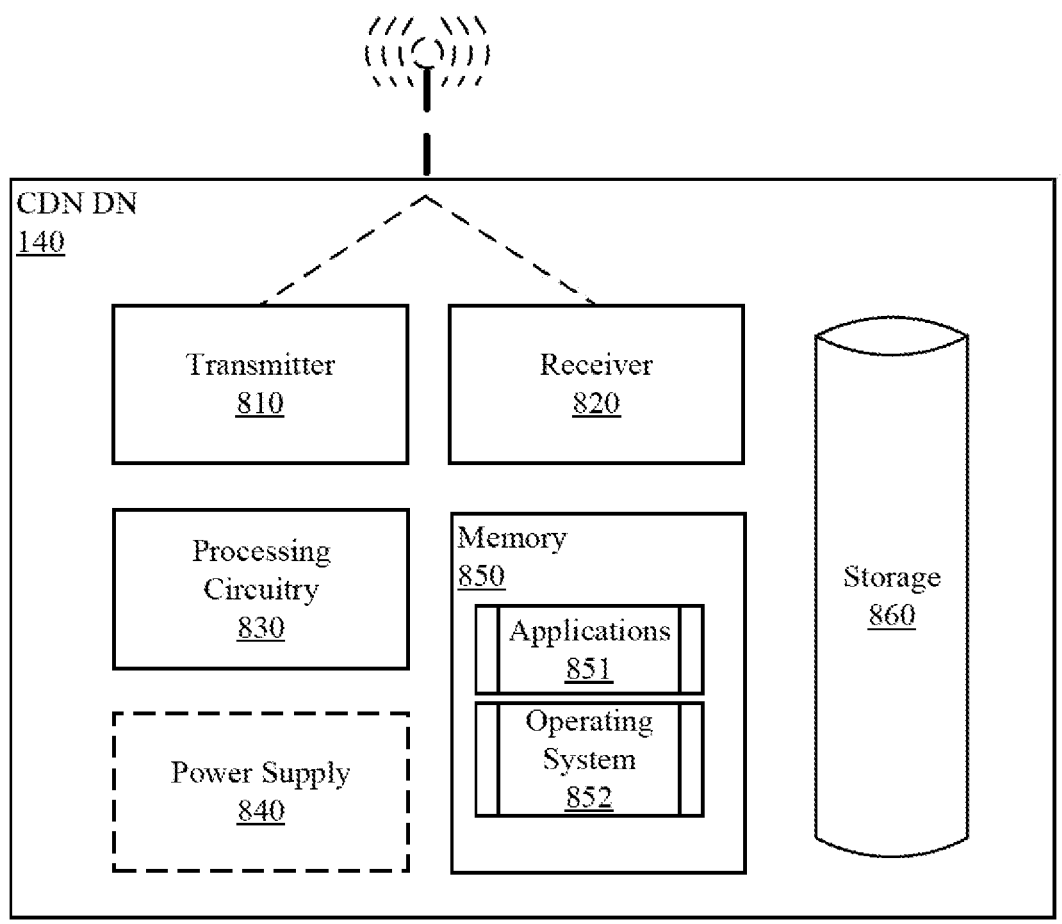
FIG. 8 is a schematic illustration of a delivery node according to an embodiment.

FIG. 8 is a block diagram of a Delivery Node (DN) 140, 150, 160 suitable for implementing aspects of the embodiments disclosed herein. The DN 140, 150, 160 includes a communications interface which may comprise transmitter 810 and receiver 820. The communications interface generally includes analog and/or digital components for sending and receiving communications to and from client devices and/or to and from other DN 140, 150, 160 or other network nodes, such as a RR 110, either through wireless or wired transmission and either directly or via a network 180 (FIG. 1). Those skilled in the art will appreciate that the block diagram of the DN 800 necessarily omits numerous features that are not necessary for a complete understanding of this disclosure.

Although all of the details of the DN 140, 150, 160 are not illustrated, the DN 140, 150, 160 comprises one or several general-purpose or special-purpose processors or processing circuitry 830 or other microcontrollers programmed with suitable software programming instructions and/or firmware to carry out some or all of the functionality of the DN 140, 150, 160 described herein. In addition, or alternatively, the DN 140, 150, 160 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the DN 140, 150, 160 described herein.

A memory 850, such as a random-access memory (RAM), SSD or HDD, may be used by the processor 830 to store data and programming instructions which, when executed by the processor 830, implement all or part of the functionality described herein. The memory may also be used to store content for distributing within the CDN 100.

The HDD or storage 860 may also be used for storing data necessary and/or suitable for implementing the functionality described herein, as well as for storing the programming instructions which, when executed on the processor 530, implement all or part of the functionality described herein.

Further, the DN 140, 150, 160 may comprise a power supply of any kind which is suitable and an antenna.

One embodiment of the present disclosure may be implemented as a computer program product that is stored on a computer-readable storage medium, the computer program product including programming instructions that are configured to cause the processor 830 to carry out the steps described herein.

Figure 9:
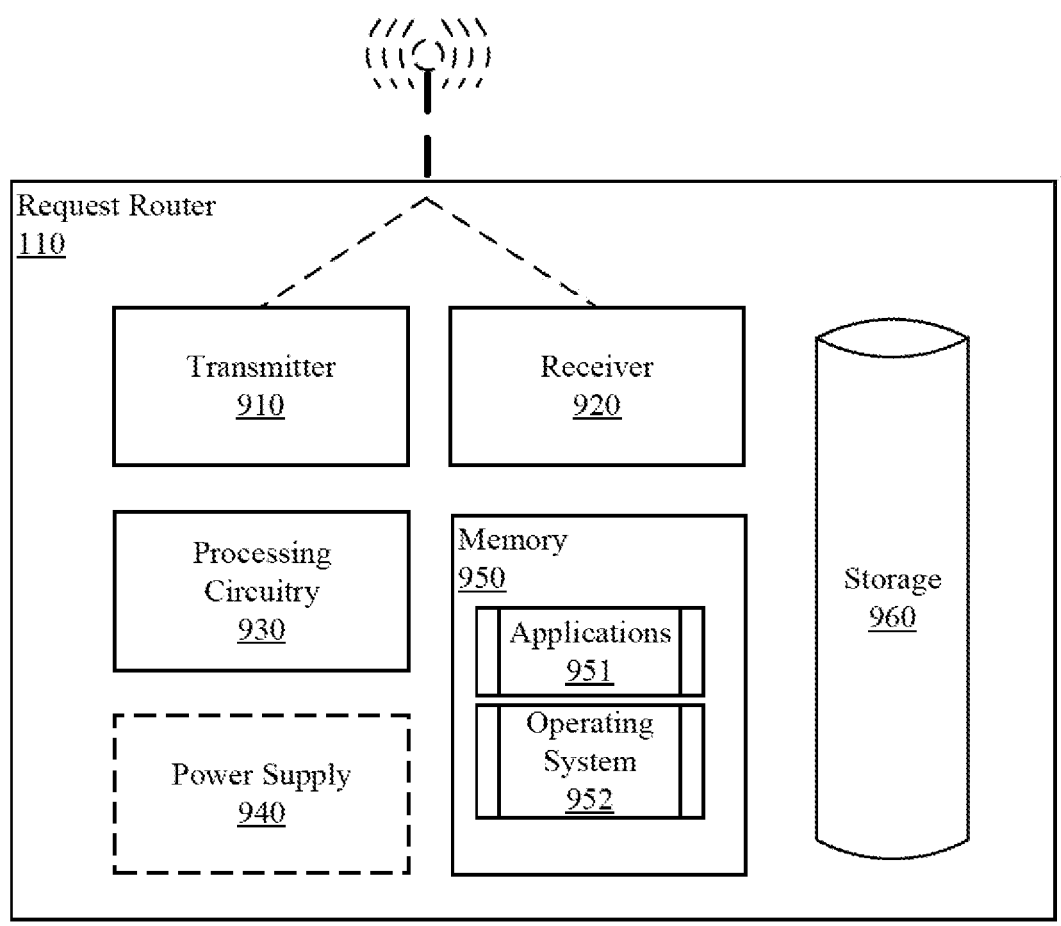
FIG. 9 is a schematic illustration of a request router according to an embodiment.

FIG. 9 is a block diagram of a Request Router (RR) 110 suitable for implementing aspects of the embodiments disclosed herein. The RR 110 includes a communications interface which may comprise transmitter 910 and receiver 920. The communications interface generally includes analog and/or digital components for sending and receiving communications to and from DN 140, 150, 160 or other network nodes, either through wireless or wired transmission and either directly or via a network 180 (FIG. 1). Those skilled in the art will appreciate that the block diagram of the RR 110 necessarily omits numerous features that are not necessary for a complete understanding of this disclosure.

Although all of the details of the RR 110 are not illustrated, the RR 110 comprises one or several general-purpose or special-purpose processors or processing circuitry 930 or other microcontrollers programmed with suitable software programming instructions and/or firmware to carry out some or all of the functionality of the RR 110 described herein. In addition, or alternatively, the RR 110 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the RR 110 described herein.

A memory 950, such as a random-access memory (RAM), SSD or HDD, may be used by the processor 930 to store data and programming instructions which, when executed by the processor 930, implement all or part of the functionality described herein. The memory may also be used to store data about the CDN 110 and DN 140, 150, 160 within the CDN, about the content stored in the DNs, about the distribution of the content, about accounts, etc.

The storage 960 may also be used for storing data necessary and/or suitable for implementing the functionality described herein, as well as for storing the programming instructions which, when executed on the processor 930, implement all or part of the functionality described herein.

Further, the RR 110 may comprise a power supply 940 of any kind which is suitable and an antenna.

One embodiment of the present disclosure may be implemented as a computer program product that is stored on a computer-readable storage medium, the computer program product including programming instructions that are configured to cause the processor 930 to carry out the steps described herein.

Figure 10:
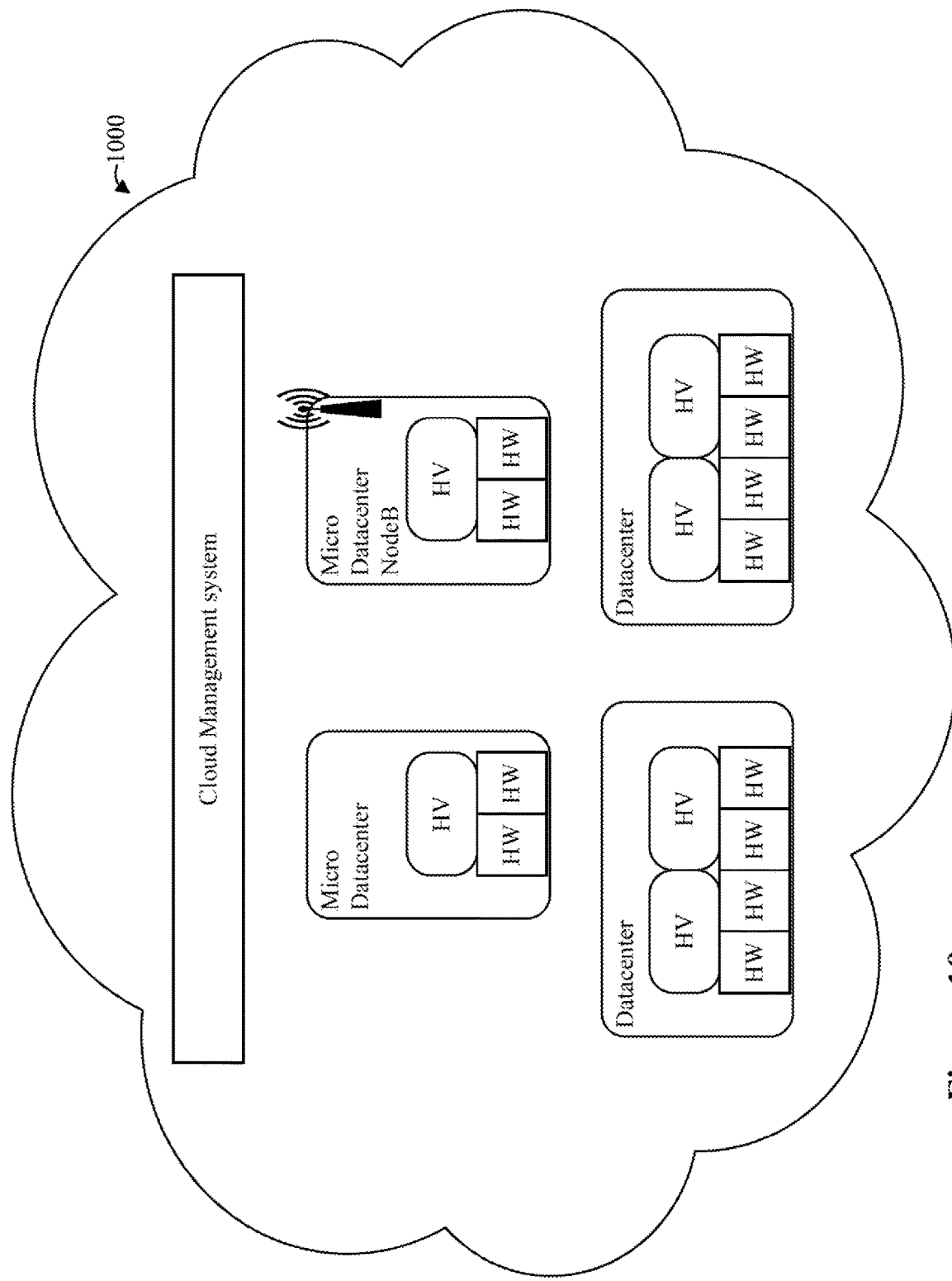
FIGS. 10 and 11 are schematic illustrations of a cloud computing environment in which some of the functionalities described herein may be implemented.
Figure 11:
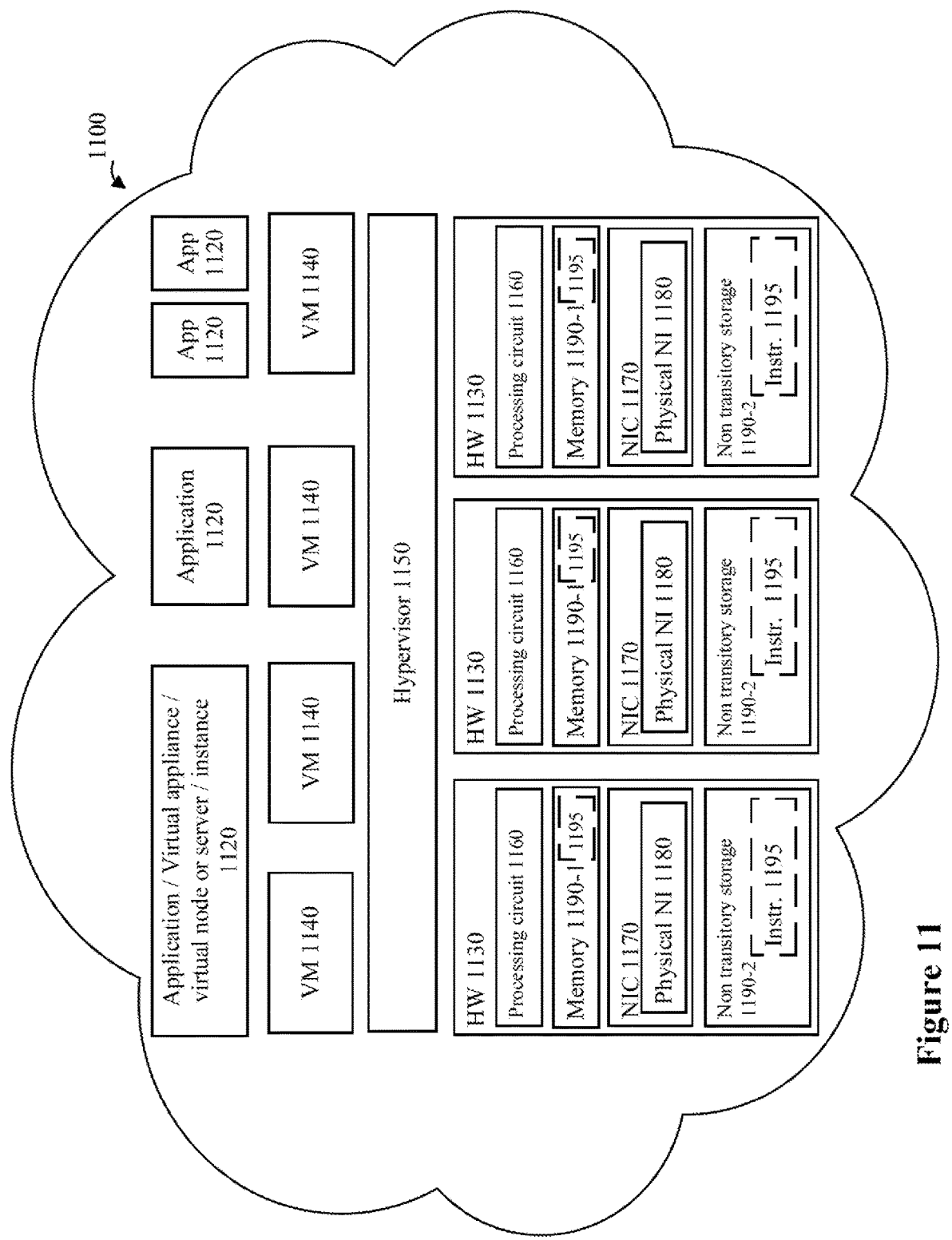

Turning to FIGS. 10 and 11, according to another embodiment, there is provided a RR instance, a DN instance or a virtual appliance 1120, in a cloud computing environment 1000, 1100 which provides processing circuit 1160 and memory 1190 for running the RR or DN instance or the virtual appliance 1120. The memory contains instructions 1195 executable by the processing circuit whereby the RR or DN instance or the virtual appliance 1120 is operative to execute methods as previously described.

The cloud computing environment 1000, 1100, comprises a general-purpose network device including hardware 1130 comprising a set of one or more processor(s) or processing circuits 1160, which can be commercial off-the-shelf (COTS) processors, dedicated Application Specific Integrated Circuits (ASICs), or any other type of processing circuit including digital or analog hardware components or special purpose processors, and network interface controller(s) 1170 (NICs), also known as network interface cards, which include physical Network Interface 1180. The general-purpose network device also includes non-transitory machine-readable storage media 1190-2 having stored therein software 1195 and/or instructions executable by the processor 1160. During operation, the processor(s) 1160 execute the software 1195 to instantiate a hypervisor 1150, sometimes referred to as a virtual machine monitor (VMM), and one or more virtual machines 1140 that are run by the hypervisor 1150. A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine, be it hardware dedicated to that virtual machine and/or time slices of hardware temporally shared by that virtual machine with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high-volume server hardware, physical switches, and physical storage, which can be located in Data centers, and customer premise equipment (CPE). Different embodiments of the DN or RR instance may be implemented on one or more of the virtual machine(s) 1140, and the implementations may be made differently.

Any appropriate steps, methods, or functions described herein may also be performed through one or more functional modules. For example, a node may comprise a plurality of modules such as a transceiver module, a processing module and a storing module. Each module can contain sub modules as would be apparent to a person skilled in the art. For example, a transceiver module may comprise a sending module and a receiving module. These modules may perform steps or functions described herein in relation with some embodiments.

Figure 12:
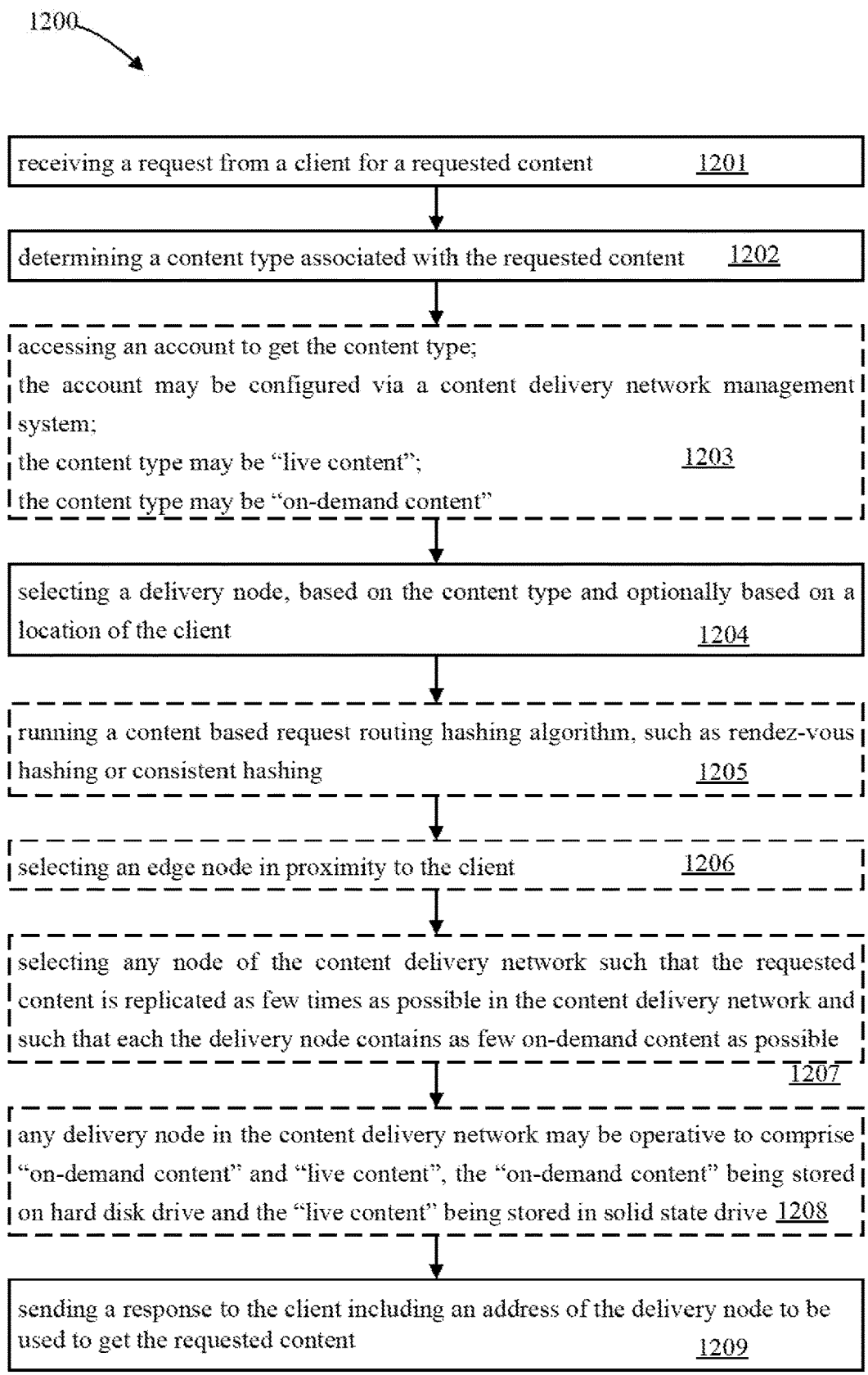
FIG. 12 illustrates a method according to an embodiment.

FIG. 12 illustrates a method 1200, executed in a request router, comprising the step of:

receiving, step 1201, a request from a client for a requested content;

determining, step 1202, a content type associated with the requested content;

selecting, step 1204, a delivery node, based on the content type and optionally based on a location of the client; and sending, step 1209, a response to the client including an address of the delivery node to be used to get the requested content.

The selecting step above may alternatively be replaced with: deciding the resource pool that contains a list of delivery nodes for content delivery, e.g. multi-tier layer deployment (within the same site or across sites) for live content delivery; and for on-demand contents, specifically long tail assets, convert the multi-tier deployment into single or reduced tier deployment in a logic view and selecting a delivery node from this resource pool by applying CBRR.

The selecting step of the method may further comprise running a content based request routing hashing algorithm, the hashing algorithm may be rendez-vous hashing or consistent hashing, step 1205.

The determining step of the method may further comprises accessing an account to get the content type. The account may be configured via a content delivery network management system. The content type may be "live content", step 1203, and if the content type is live content, the step of selecting may comprise selecting an edge node in proximity to the client, step 1206.

The content type may be "on-demand content", step 1203, and if the content type is on-demand content, the step of selecting may comprise selecting any node of the content delivery network such that the requested content is replicated as few times as possible in the content delivery network and such that each the delivery node contains as few on-demand contents as possible, step 1207. Replicated as few times as possible may mean no replication, 1, 2 or any other number of replication which is small compared to the number of nodes in the content delivery network.

Any delivery node in the content delivery network may be operative to comprise "on-demand content" and "live content" being stored on multi-tier storage management system, e.g. "on-demand content" being stored on HDD, and the "live content" being stored in memory or SSD, step 1208.

There is provided a content delivery network comprising delivery nodes and a request router, the content delivery network being operative to execute methods according to the described embodiments.

There is provided a delivery node comprising processing circuitry, memory which may be in the form of hard disk drive and solid-state drive, transceiver and power supply, the delivery node being operative to execute methods according to the described embodiments.

There is provided a request router comprising processing circuitry, memory, transceiver and power supply, the request router being operative to execute methods according to the described embodiments.

There is provided an apparatus comprising a transceiver module, a processing module and a storage module and being operative to execute methods according to the described embodiments.

There is provided a non-transitory computer readable media having stored thereon instructions for executing methods according to the described embodiments.

Figure 13:
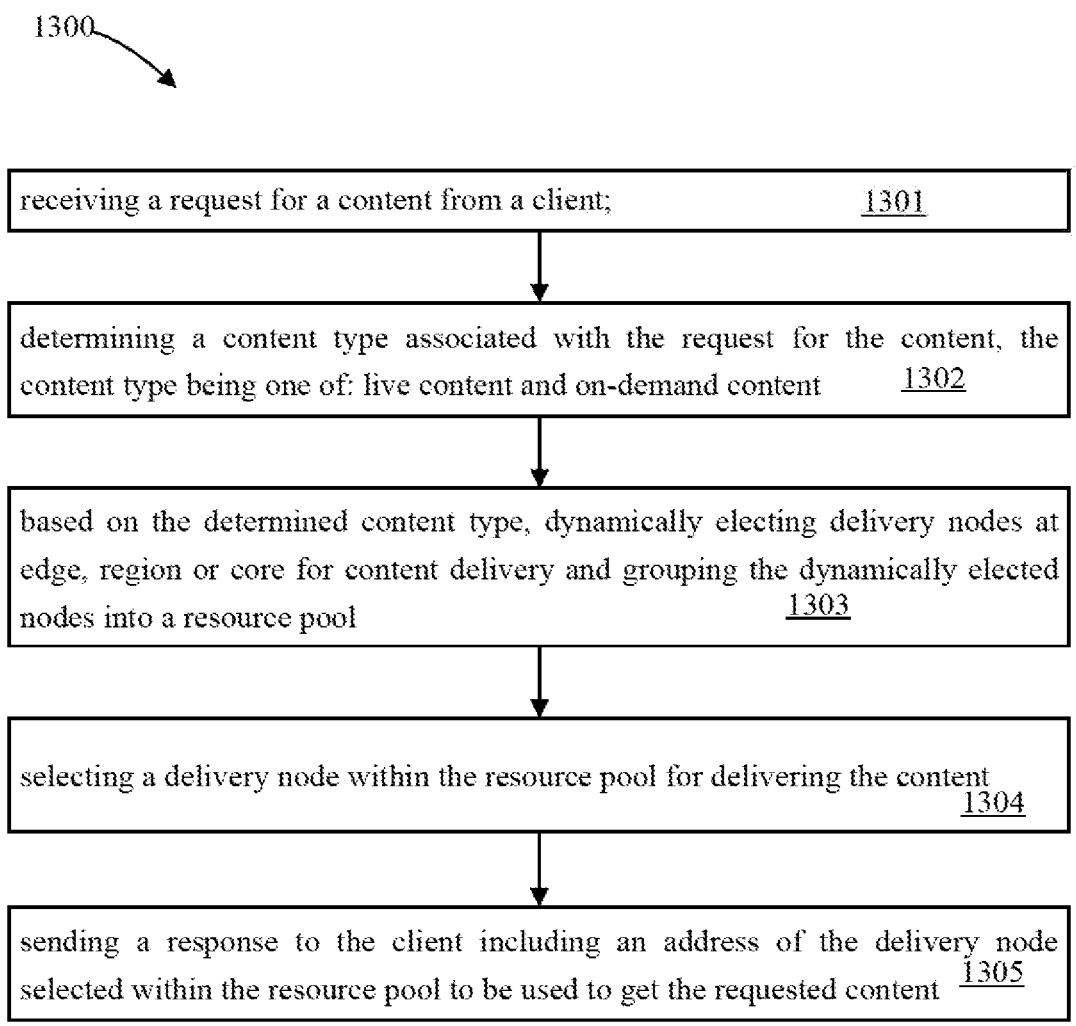
FIG. 13 illustrates a method according to an embodiment.

FIG. 13 illustrates a method 1300 which includes some rearrangements of steps and elements previously described.

The method 1300, executed in a request router (RR), is for dynamically pooling resources in a Content Delivery Network (CDN), for efficient delivery of live and on-demand content. The method comprises receiving a request for a content from a client, 1301, determining a content type associated with the request for the content, the content type being one of: live content and on-demand content, 1302, and based on the determined content type, dynamically electing delivery nodes at edge, region or core for content delivery and grouping the dynamically elected nodes into a resource pool, 1303. The method comprises selecting a delivery node within the resource pool for delivering the content, 1304, and sending a response to the client including an address of the delivery node selected within the resource pool to be used to get the requested content, 1305.

The method further comprises, if the content is not cached in the delivery node selected within the resource pool, selecting a next-tier delivery node within the resource pool or an origin server to fetch the content. If the content type is live content, the step of selecting a delivery node comprises selecting an edge node within the resource pool, the edge node being in proximity to the client. The method further comprises, if the content type is on-demand content, converting the resource pool into a one-layer logic view, and the step of selecting a delivery node comprises selecting the delivery node from the one-layer logical view of resource pool by applying Content based Request Routing (CBRR). If the content type is on-demand content, the one-layer logic view comprises all the delivery nodes of the CDN and the step of selecting the delivery node comprises selecting any node of the CDN such that the requested content is replicated as few times as possible in the CDN and such that each the delivery node contains as few on-demand contents as possible. The delivery node selected within the resource pool may be operative to comprise live content and on-demand content, the live content may be stored in fast memory and the on-demand content may be stored on slow memory. Determining a content type may comprise accessing an account to get the content type. The account may be configured via a content delivery network management system.

Returning to FIG. 9, there is provided a request router (RR) 110 comprising processing circuitry 930 and a memory 950, the memory 950 containing instructions executable by the processing circuitry 930 whereby the RR 110 is operative to receive a request for a content from a client, determine a content type associated with the request for the content, the content type being one of: live content and on-demand content, and based on the determined content type, dynamically elect delivery nodes at edge, region or core for content delivery and group the dynamically elected nodes into a resource pool. The RR is operative to select a delivery node within the resource pool for delivering the content, and send a response to the client including an address of the delivery node selected within the resource pool to be used to get the requested content.

The RR may further be operative to, if the content is not cached in the delivery node selected within the resource pool, select a next-tier delivery node within the resource pool or an origin server to fetch the content. The RR may further be operative to, if the content type is live content, select an edge node within the resource pool, the edge node being in proximity to the client. The RR may further be operative to, if the content type is on-demand content, convert the resource pool into a one-layer logic view, and select a delivery node from the one-layer logical view of resource pool by applying Content based Request Routing (CBRR). The content type may be on-demand content, the one-layer logic view may comprise all the delivery nodes of the CDN and the RR may be operative to select any node of the CDN such that the requested content is replicated as few times as possible in the CDN and such that each delivery node contains as few on-demand contents as possible. The delivery node selected within the resource pool may be operative to comprise live content and on-demand content, the live content may be stored in fast memory and the on-demand content may be stored on slow memory. The RR may further be operative to access an account to get the content type for determining a content type. The account may be configured via a content delivery network management system.

A Content Delivery Network (CDN) 100 comprises delivery nodes (DNs) 140, 150, 160 and the request router (RR) 110 as described previously, the RR being operative for dynamically pooling resources in the CDN, for efficient delivery of live and on-demand content.

There is also provided a non-transitory computer readable media 960 having stored thereon instructions for executing steps of any of the methods described herein.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method, executed in a request router (RR), for dynamically pooling resources in a Content Delivery Network (CDN), for efficient delivery of live and on-demand content, comprising the steps of:
   receiving a request for a content from a client;
   determining a content type associated with the request for the content, the content type being one of: live content and on-demand content;
   based on the determined content type, dynamically electing delivery nodes at edge, region or core for content delivery and grouping the dynamically elected nodes into a resource pool;
   selecting a delivery node within the resource pool for delivering the content;
   sending a response to the client including an address of the delivery node selected within the resource pool to be used to get the requested content; and
   if the content type is on-demand content, converting the resource pool into a one-layer logic view;
   wherein the step of selecting a delivery node comprises selecting the delivery node from the one-layer logical view of resource pool by applying Content based Request Routing (CBRR); and
   wherein if the content type is on-demand content, the one-layer logic view comprises all the delivery nodes of the CDN and the step of selecting the delivery node comprises selecting any node of the CDN that reduces content replication in the CDN and that reduces on-demand content at each delivery node.

2. The method of claim 1, further comprising, if the content is not cached in the delivery node selected within the resource pool, selecting a next-tier delivery node within the resource pool or an origin server to fetch the content.

3. The method of claim 1, wherein, if the content type is live content, the step of selecting a delivery node comprises selecting an edge node within the resource pool, the edge node being in proximity to the client.

4. The method of claim 1, wherein the delivery node selected within the resource pool is operative to comprise live content and on-demand content, wherein live content is stored in a fast memory and wherein on-demand content is stored in a slow memory.

5. The method of claim 1, wherein determining a content type comprises accessing an account for the content to get the content type.

6. The method of claim 5, wherein the account is configured via a content delivery network management system.

7. A request router (RR) comprising processing circuitry and a memory, the memory containing instructions executable by the processing circuitry whereby the RR is operative to:
   receive a request for a content from a client;
   determine a content type associated with the request for the content, the content type being one of: live content and on-demand content;
   based on the determined content type, dynamically elect delivery nodes at edge, region or core for content delivery and group the dynamically elected nodes into a resource pool;
   select a delivery node within the resource pool for delivering the content; and
   send a response to the client including an address of the delivery node selected within the resource pool to be used to get the requested content; and
   if the content type is on-demand content, convert the resource pool into a one-layer logic view;
   wherein the RR is further operative to select a delivery node from the one-layer logical view of resource pool by applying Content based Request Routing (CBRR); and
   wherein if the content type is on-demand content, the one-layer logic view comprises all the delivery nodes of the CDN and the RR is further operative to select any node of the CDN that reduces content replication in the CDN and that reduces on-demand content at each delivery node.

8. The RR of claim 7, further operative to, if the content is not cached in the delivery node selected within the resource pool, select a next-tier delivery node within the resource pool or an origin server to fetch the content.

9. The RR of claim 7, further operative to, if the content type is live content, select an edge node within the resource pool, the edge node being in proximity to the client.

10. The RR of claim 7, wherein the delivery node selected within the resource pool is operative to comprise live content and on-demand content, wherein live content is stored in a fast memory and wherein on-demand content is stored in a slow memory.

11. The RR of claim 7, further operative to access an account for the content to get the content type for determining a content type.

12. The RR of claim 11, wherein the account is configured via a content delivery network management system.

13. A Content Delivery Network (CDN) comprising delivery nodes (DNs) and the request router (RR) of claim 7, the RR being operative for dynamically pooling resources in the CDN, for efficient delivery of live and on-demand content.

14. A non-transitory computer readable media having stored thereon instructions for executing the steps of the method of claim 1.

* * * * *